(12) United States Patent
Uejima et al.

(10) Patent No.: US 7,456,703 B2
(45) Date of Patent: Nov. 25, 2008

(54) HIGH FREQUENCY SWITCH AND METHOD FOR MANUFACTURING THE SAME

(75) Inventors: Takanori Uejima, Moriyama (JP); Naoki Nakayama, Sakai (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 11/690,306

(22) Filed: Mar. 23, 2007

(65) Prior Publication Data

US 2007/0161353 A1    Jul. 12, 2007

Related U.S. Application Data

(63) Continuation of application No. PCT/JP2005/017771, filed on Sep. 27, 2005.

(30) Foreign Application Priority Data

Sep. 30, 2004  (JP) ............... 2004-287779
Sep. 30, 2004  (JP) ............... 2004-287780

(51) Int. Cl.
  *H01P 1/15* (2006.01)
  *H04B 1/40* (2006.01)
(52) U.S. Cl. ................... 333/103; 333/101
(58) Field of Classification Search ........... 333/101, 333/103; 330/69
  See application file for complete search history.

(56) References Cited

U.S. PATENT DOCUMENTS 3,564,444 A * 2/1971 Walsh ................. 330/69
6,586,786 B2 * 7/2003 Kitazawa et al. ........... 257/275
6,633,206 B1   10/2003 Kato
6,897,738 B2    5/2005 Kato

FOREIGN PATENT DOCUMENTS

| JP | 10-294474 A | 11/1998 |
|----|---|---|
| JP | 11-027177 A | 1/1999 |
| JP | 2000-196496 A | 7/2000 |
| JP | 2000-223901 A | 8/2000 |
| JP | 2001-044885 A | 2/2001 |
| JP | 2003-124702 A | 4/2003 |
| JP | 2004-253948 A | 9/2004 |

OTHER PUBLICATIONS

Official Communication for PCT Application No. PCT/JP2005/017771; mailed on Jan. 17, 2006.

* cited by examiner

Primary Examiner—Dean O Takaoka
(74) Attorney, Agent, or Firm—Keating & Bennett, LLP

(57) ABSTRACT

A high frequency switch includes electrically connected switching elements, such as a first diode, a second diode, inductors, capacitors, and a resistor. A diode having a smaller charge capacity in the ON state is used as the first diode, while a diode having a larger charge capacity in the ON state is used as the second diode. That is, the first and second diodes utilize different part number diodes. A diode part number having a smaller charge capacity is used as the first diode, while a diode part number having a larger charge capacity is used as the second diode. Alternatively, the charge capacity of diodes that belong to the same lot may be measured and classified, so that a smaller charge capacity diode is used as the first diode, while a larger charge capacity diode is used as the second diode.

12 Claims, 3 Drawing Sheets

HIGH FREQUENCY SWITCH AND METHOD FOR MANUFACTURING THE SAME

BACKGROUND OF THE INVENTION

1. Field of the Invention

The present invention relates to a high frequency switch and a method for manufacturing the same. More particularly, the present invention relates to a high frequency switch and a method for manufacturing the same, which can be used for a plurality of different mobile communication systems.

2. Description of the Related Art

For example, Japanese Unexamined Patent Application Publication No. 2000-223901 (Patent Document 1) describes a high frequency switch that includes a first diode and a second diode. The first diode is electrically connected in series with a signal path between an antenna terminal and a transmission-side input terminal. The second diode is electrically connected in shunt with a signal path between the antenna terminal and a reception-side output terminal. The high frequency switch selectively switches between the signal path between the antenna terminal and the transmission-side input terminal and the signal path between the antenna terminal and the reception-side output terminal. The first diode and the second diode have the same specifications. The first diode and the second diode have been generally arbitrarily selected from the same lot to manufacture a high frequency switch. It is noted that diodes that belong to the same lot also have a variances of approximately plus or minus 10 percent of charge capacity.

In the high frequency switch, a short "switching time from the transmission mode to the reception mode" is required in order to prevent a high-power transmission signal from flowing into a reception-side signal path. For this reason, characteristics of the first diode and second diode should be set in appropriate relation to each other.

However, as described above in the related art, the first diode and the second diode are selected arbitrarily from the same lot, and it has not been considered to set characteristics of the first diode and second diode in appropriate relation to each other. This causes, when a high frequency switch is manufactured, "a switching time from the transmission mode to the reception mode" to become long and, therefore, a high frequency switch that has a high-power transmission signal flowing into the reception-side signal path may be obtained.

SUMMARY OF THE INVENTION

To overcome the problems described above, preferred embodiments of the present invention provide a high frequency switch that has a short switching time from the transmission mode to the reception mode and a method for manufacturing such a novel high frequency switch.

A high frequency switch according to a preferred embodiment of the present invention includes a switch. The switch includes a first diode and a second diode. The first diode is electrically connected in series with a signal path between an antenna terminal and a transmission-side input terminal. The second diode is electrically connected in shunt with a signal path between the antenna terminal and a reception-side output terminal. The switch selectively switches between the signal path between the antenna terminal and the transmission-side input terminal and the signal path between the antenna terminal and the reception-side output terminal. In the high frequency switch, a diode having a smaller charge capacity is used as the first diode, while a diode having a larger charge capacity is used as the second diode, such that the charge capacity of the first diode is always less than the charge capacity of the second diode.

For example, the charge capacity of the diode having a smaller charge capacity is outside the range of approximately minus 10 percent of the specification of charge capacity of the diode having a larger charge capacity. In addition, the part number of the diode having a larger charge capacity differs from the part number of the diode having a smaller charge capacity.

According to the above-described high frequency switch, when the transmission mode is switched into the reception mode, both the first diode and the second diode discharge electric charge stored therein. Then, because the amount of electric charge stored in the first diode is less than the amount of electric charge stored in the second diode, electric charge stored in the first diode completes being discharged first. Accordingly, the first diode is brought into the OFF state in a shorter amount of time. Thus, the switching time from the transmission mode to the reception mode is reduced.

Furthermore, a high frequency switch according to another preferred embodiment of the present invention includes a diplexer, a first switch, and a second switch. The diplexer is electrically connected next to an antenna terminal to branch a signal path into a signal path of a first communication system and a signal path of a second communication system. The first switch is arranged in the signal path of the first communication system. The first switch includes a first diode and a second diode. The first diode is electrically connected in series with a signal path between the antenna terminal and a first transmission-side input terminal. The second diode is electrically connected in shunt with a signal path between the antenna terminal and a first reception-side output terminal. The first switch selectively switches between the signal path between the antenna terminal and the first transmission-side input terminal and the signal path between the antenna terminal and the first reception-side output terminal. The second switch is arranged in the signal path of the second communication system. The second switch includes a third diode and a fourth diode. The third diode is electrically connected in series with a signal path between the antenna terminal and a second transmission-side input terminal. The fourth diode is electrically connected in shunt with a signal path between the antenna terminal and a second reception-side output terminal. The second switch selectively switches between the signal path between the antenna terminal and the second transmission-side input terminal and the signal path between the antenna terminal and the second reception-side output terminal. In the high frequency switch, diodes having a smaller charge capacity are used as the first diode and the third diode, while diodes having a larger charge capacity are used as the second diode and the fourth diode, such that the charge capacities of the first diode and third diode are always less than the charge capacities of the second diode and fourth diode, respectively.

According to the above-described structure, a dual-band high frequency switch that accepts signal processing of two communication systems is obtained.

Moreover, a high frequency switch according to another preferred embodiment of the present invention includes a diplexer, a first switch, a second switch, and a duplexer. The diplexer is electrically connected next to an antenna terminal to branch a signal path into a signal path of a first communication system and a signal path of a second communication system and third communication system. The first switch is arranged in the signal path of the first communication system. The first switch includes a first diode and a second diode. The first diode is electrically connected in series with a signal path between the antenna terminal and a first transmission-side input terminal. The second diode is electrically connected in shunt with a signal path between the antenna terminal and a first reception-side output terminal. The first switch selectively switches between the signal path between the antenna terminal and the first transmission-side input terminal and the signal path between the antenna terminal and the first reception-side output terminal. The second switch is arranged in the signal path of the second communication system and third communication system. The second switch includes a third diode and a fourth diode. The third diode is electrically connected in series with a signal path between the antenna terminal and a second transmission-side input terminal, which is a terminal shared by the second communication system and the third communication system. The fourth diode is electrically connected in shunt with a signal path between the antenna terminal and second and third reception-side output terminals. The second switch selectively switches between the signal path between the antenna terminal and the second transmission-side input terminal and the signal path between the antenna terminal and the second and third reception-side output terminals. The duplexer is arranged in the signal path of the second communication system and third communication system to branch the signal path into a signal path between the second switch and the second reception-side output terminal and a signal path between the second switch and the third reception-side output terminal. In the high frequency switch, diodes having a smaller charge capacity are used as the first diode and the third diode, while diodes having a larger charge capacity are used as the second diode and the fourth diode, so that the charge capacities of the first diode and third diode are always less than the charge capacities of the second diode and fourth diode, respectively.

According to the above-described structure, a triple-band high frequency switch that accepts signal processing of three communication systems is obtained.

Another preferred embodiment of the present invention provides a method for manufacturing a high frequency switch that includes a switch. The switch includes a first diode and a second diode. The first diode is electrically connected in series with a signal path between an antenna terminal and a transmission-side input terminal. The second diode is electrically connected in shunt with a signal path between the antenna terminal and a reception-side output terminal. The switch selectively switches between the signal path between the antenna terminal and the transmission-side input terminal and the signal path between the antenna terminal and the reception-side output terminal. The method includes classifying diodes that belong to the same lot on the basis of the charge capacity thereof, using a diode having a smaller charge capacity as the first diode, and using a diode having a larger charge capacity as the second diode.

According to the high frequency switch obtained by the above-described method, when the transmission mode is switched to the reception mode, both the first diode and the second diode discharge electric charge stored therein. Then, because the amount of electric charge stored in the first diode is less than the amount of electric charge stored in the second diode, electric charge stored in the first diode completes being discharged first. Accordingly, the first diode is brought into the OFF state in a shorter time. Thus, the switching time from the transmission mode to the reception mode is reduced.

Another preferred embodiment of the present invention further provides a method for manufacturing a high frequency switch that includes a diplexer, a first switch, and a second switch. The diplexer is electrically connected next to an antenna terminal to branch a signal path into a signal path of a first communication system and a signal path of a second communication system. The first switch is arranged in the signal path of the first communication system. The first switch includes a first diode and a second diode. The first diode is electrically connected in series with a signal path between the antenna terminal and a first transmission-side input terminal. The second diode is electrically connected in shunt with a signal path between the antenna terminal and a first reception-side output terminal. The first switch selectively switches between the signal path between the antenna terminal and the first transmission-side input terminal and the signal path between the antenna terminal and the first reception-side output terminal. The second switch is arranged in the signal path of the second communication system. The second switch includes a third diode and a fourth diode. The third diode is electrically connected in series with a signal path between the antenna terminal and a second transmission-side input terminal. The fourth diode is electrically connected in shunt with a signal path between the antenna terminal and a second reception-side output terminal. The second switch selectively switches between the signal path between the antenna terminal and the second transmission-side input terminal and the signal path between the antenna terminal and the second reception-side output terminal. The method includes classifying diodes that belong to the same lot on the basis of the charge capacity thereof, using diodes having a smaller charge capacity as the first diode and the third diode, and using diodes having a larger charge capacity as the second diode and the fourth diode.

According to the above-described method, a dual-band high frequency switch that accepts signal processing of two communication systems is obtained.

Another preferred embodiment of the present invention provides a method for manufacturing a high frequency switch that includes a diplexer, a first switch, a second switch, and a duplexer. The diplexer is electrically connected next to an antenna terminal to branch a signal path into a signal path of a first communication system and a signal path of a second communication system and third communication system. The first switch is arranged in the signal path of the first communication system. The first switch includes a first diode and a second diode. The first diode is electrically connected in series with a signal path between the antenna terminal and a first transmission-side input terminal. The second diode is electrically connected in shunt with a signal path between the antenna terminal and a first reception-side output terminal. The first switch selectively switches between the signal path between the antenna terminal and the first transmission-side input terminal and the signal path between the antenna terminal and the first reception-side output terminal. The second switch is arranged in the signal path of the second communication system and third communication system. The second switch includes a third diode and a fourth diode. The third diode is electrically connected in series with a signal path between the antenna terminal and a second transmission-side input terminal, which is a terminal shared by the second communication system and the third communication system. The fourth diode is electrically connected in shunt with a signal path between the antenna terminal and second and third reception-side output terminals. The second switch selectively switches between the signal path between the antenna terminal and the second transmission-side input terminal and the signal path between the antenna terminal and the second and third reception-side output terminals. The duplexer is arranged in the signal path of the second communication system and third communication system to branch the signal path into a signal path between the second switch and the second reception-side output terminal and a signal path between the second switch and the third reception-side output terminal. The method includes classifying diodes that belong to the same lot on the basis of the charge capacity thereof, using diodes having a smaller charge capacity as the first diode and the third diode, and using diodes having a larger charge capacity as the second diode and the fourth diode.

According to the above-described method, a triple-band high frequency switch that accepts signal processing of three communication systems is obtained.

According to preferred embodiments of the present invention, a diode having a smaller charge capacity is used as a first diode that is electrically connected in series with a transmission-side signal path, while a diode having a larger charge capacity is used as a second diode that is electrically connected in shunt with a reception-side signal path. With this configuration, in a high frequency switch, when the transmission mode is switched to the reception mode, because the amount of electric charge stored in the first diode is less than the amount of electric charge stored in the second diode, electric charge stored in the first diode completes being discharged first. Accordingly, the first diode is brought into the OFF state in a shorter time. Thus, the switching time from the transmission mode to the reception mode is reduced. As a result, when a high frequency switch is manufactured, a high frequency switch that prevents a high-power transmission signal from flowing into a reception-side signal path is always obtained.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of a high frequency switch and a method for manufacturing the high frequency switch according to the present invention will now be described with reference to the attached drawings.

First Preferred Embodiment

Figure 1:
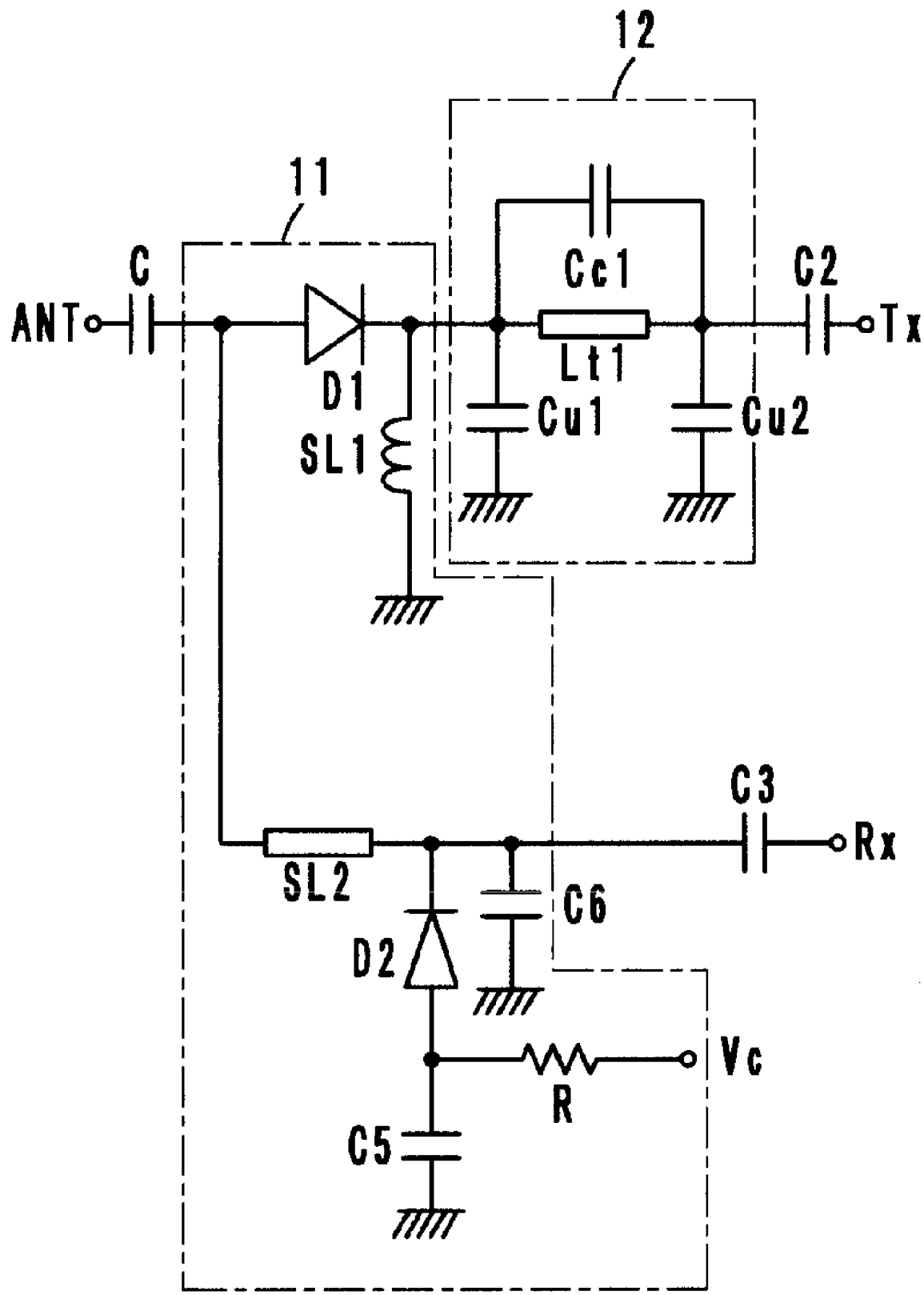
FIG. 1 is an equivalent circuit diagram that illustrates a first preferred embodiment of a high frequency switch according to the present invention.

A single-band high frequency switch according to the first preferred embodiment preferably includes a high frequency switch 11, an LC filter 12, and capacitors C, C2, and C3, as shown in the equivalent circuit diagram of FIG. 1.

The high frequency switch 11 is used to selectively switch between a signal path between an antenna terminal ANT and a transmission-side input terminal Tx and a signal path between the antenna terminal ANT and a reception-side output terminal Rx. The LC filter 12 is arranged between the high frequency switch 11 and the transmission-side input terminal Tx. The LC filter 12 is a low-pass filter that includes an inductor Lt1 and capacitors. The capacitors of the low-pass filter include a capacitor Cc1 that is electrically connected in parallel with the inductor Lt1, and two ground capacitors (shunt capacitors) Cu1, Cu2 that are grounded.

The high frequency switch 11 includes switching elements, such as a first diode D1, a second diode D2, inductors SL1, SL2, capacitors C5, C6, and a resistor R, which are electrically connected. The first diode D1 is electrically connected in series with a signal path between the antenna terminal ANT and the transmission-side input terminal Tx so that the anode of the diode D1 is disposed on the side of the antenna terminal ANT. The inductor SL1 is electrically connected between the cathode of the first diode D1 and a ground. The second diode D2 is electrically connected in shunt with a signal path between the antenna terminal ANT and the reception-side output terminal Rx, and the anode of the second diode D2 is grounded via the capacitor C5. A control voltage terminal Vc is electrically connected via the resistor R to the connection point between the second diode D2 and the capacitor C5. The inductor SL2 is electrically connected in series between the cathode of the second diode D2 and the antenna terminal ANT, while the capacitor C6 is electrically connected between the cathode of the second diode D2 and a ground.

In order to always obtain a high frequency switch that has a short switching time from the transmission mode to the reception mode, characteristics of the first diode D1 and second diode D2 are set in appropriate relation to each other. In other words, a diode having a smaller charge capacity in the ON state is used as the first diode D1, while a diode having a larger charge capacity in the ON state is used as the second diode D2. Specifically, diodes having different part numbers are used as the first diode D1 and the second diode D2, respectively. In addition, a diode of the part number having a smaller charge capacity is used as the first diode D1, while a diode of the part number having a larger charge capacity is used as the second diode D2. Furthermore, the charge capacity of a diode of the part number having a smaller charge capacity is preferably outside the range of approximately plus or minus 10 percent of the specification of charge capacity of a diode of the part number having a larger charge capacity. This is because diodes that belong to the same lot also have a variance of approximately plus or minus 10 percent of charge capacity.

Alternatively, the following classifying process may be performed in advance so that characteristics of the first diode D1 and second diode D2 are set in appropriate relation to each other. That is, the charge capacity of diodes that belong to the same lot in the ON state (which is in a state where a voltage applied to a diode is approximately equal to or more than 0.4 V) may be measured using a measuring device, such as an impedance analyzer, and then classified. Then, a diode having a smaller charge capacity may be used as the first diode D1, while a diode having a larger charge capacity may be used as the second diode D2.

The operation of a high frequency switch according to the above structure will now be described. When a transmission signal is transmitted (transmission mode), a voltage of about 2.5 V is, for example, applied to the control voltage terminal Vc to bring the first diode D1 and the second diode D2 into the ON state. This allows a transmission signal that is input from the transmission-side input terminal Tx to pass the LC filter 12 and the high frequency switch 11, and the transmission signal is then transmitted from the antenna terminal ANT. On the other hand, the inductor SL2 has a stripline with a length of λ/4 relative to a frequency of the transmission signal, so the impedance becomes infinite and a signal does not pass between the antenna terminal ANT and the reception terminal Rx. In addition, the LC filter 12 attenuates harmonics of the transmission signal.

Conversely, when a reception signal is received (reception mode), a voltage of about 0 V is, for example, applied to the control voltage terminal Vc to bring the first diode D1 and the second diode D2 into the OFF state. This allows the capacity of the first diode D1 in the OFF state and the inductor SL1 to form a bypass filter. This generates high impedance in the reception band to prevent the reception signal from flowing to the transmission-side input terminal Tx, while the reception signal that is input from the antenna terminal ANT is output to the reception-side output terminal Rx.

The switching operation from the transmission mode to the reception mode will now be described in detail. In the transmission mode, the first diode D1 and the second diode D2 are in the ON state. When an electric charge stored in the first diode D1 is Q1 and an electric charge stored in the second diode D2 is Q2, because the charge capacity of the first diode D1 is less than the charge capacity of the second diode D2, the relation that Q1 is less than Q2 (Q1<Q2) is established. In this state, a voltage of 0 V is applied to the control voltage terminal Vc in order to switch from the transmission mode to the reception mode, both the first diode D1 and the second diode D2 discharge the stored electric charge. Because the stored electric charge Q1 of the first diode D1 is less than the stored electric charge Q2 of the second diode D2, the first diode D1 completes electric discharge first. Accordingly, the first diode D1 is brought into the OFF state in a shorter amount of time. Thus, a high frequency switch having a short switching time from the transmission mode to the reception mode is obtained.

Table 1 shows the results of a switching time as measured for high frequency switches from the transmission mode to the reception mode. The high frequency switches are manufactured to have various combinations of the first diode D1 and the second diode D2, which have different capacitances. It is noted that in Table 1, capacitances C1 and C2 are used instead of charge capacities Q1 and Q2, respectively. However, when an applied voltage V is constant, if C1 is less than C2 (C1<C2), the relation that Q1 is less than Q2 (Q1<Q2) is also established based on the equation Q=CV. Each capacitance C1, C2 in Table 1 is obtained when a voltage of about 0.8 V is applied to the diodes.

TABLE 1

| Samples | Capacitance C1(pF) of First Diode D1 in ON State | Capacitance C2(pF) of Second Diode D2 in ON State | Switching Time(µS) from Transmission Mode to Reception Mode |
|---|---|---|---|
| 1 | 2818 | 5020 | 0.228 |
| 2 * | 5020 | 2818 | 11.4 |
| 3 | 2788 | 3063 | 0.215 |
| 4 * | 3063 | 2788 | 4.348 |

Note that * indicates that it is out of the scope of the present invention.

Table 1 demonstrates that a high frequency switch has a short switching time from the transmission mode to the reception mode, by using a diode having a smaller capacitance (a smaller charge capacity) as the first diode D1 that is electrically connected in series with a transmission-side signal path, while using a diode having a larger capacitance (a larger charge capacity) as the second diode D2 that is electrically connected in shunt with a reception-side signal path.

It is noted that in the first preferred embodiment, the high frequency switch 11 and the LC filter 12 are manufactured integrally as a laminated block that is formed by laminating a plurality of dielectric layers.

Second Preferred Embodiment

Figure 2:
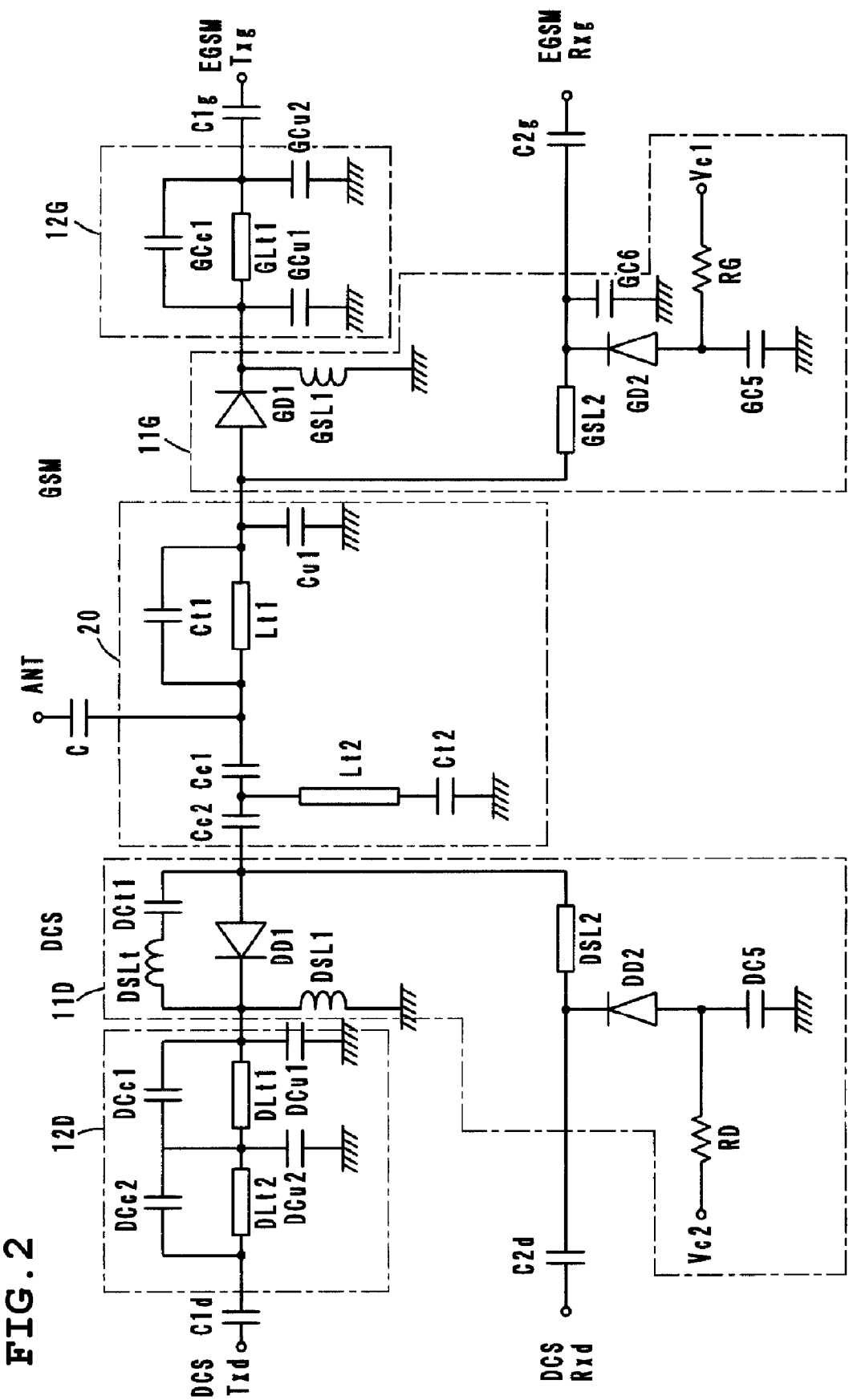
FIG. 2 is an equivalent circuit diagram that illustrates a second preferred embodiment of a high frequency switch according to the present invention.
Figure 3:
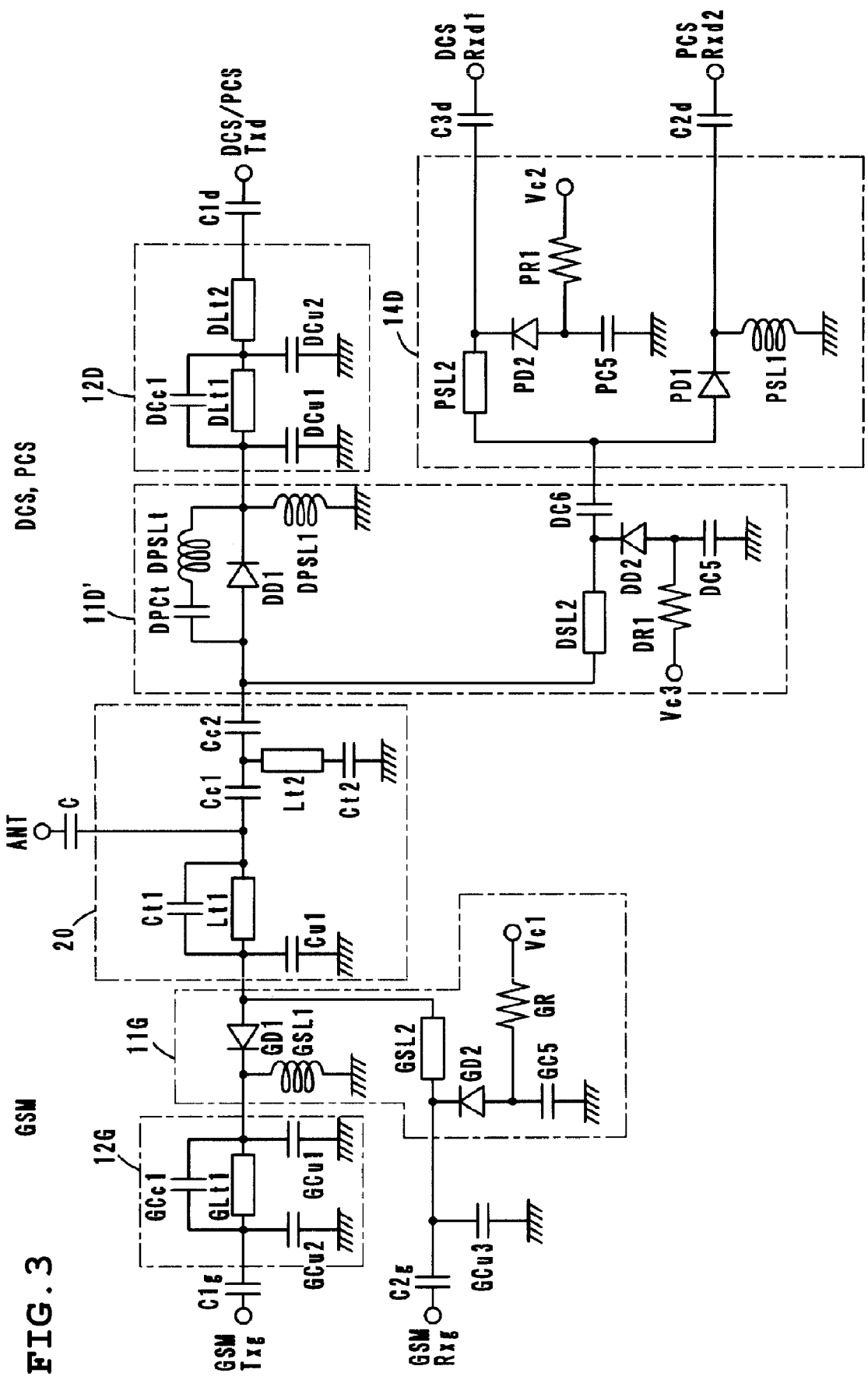
FIG. 3 is an equivalent circuit diagram that illustrates a third preferred embodiment of a high frequency switch according to the present invention.

A dual-band high frequency switch (front end module) is provided with two different communication systems, including a GSM system and a DCS system. The high frequency switch, as shown in the equivalent circuit diagram of FIG. 2, includes a diplexer 20 and a capacitor C, which are electrically connected next to an antenna terminal ANT. The diplexer 20 branches into a signal path of the GSM system and a signal path of the DCS system. The GSM system includes a first high frequency switch 1G, a first LC filter 12G, and capacitors C1g, C2g. Similarly, the DCS system includes a second high frequency switch 11D, a second LC filter 12D, and capacitors C1d, C2d.

The first high frequency switch 11G selectively switches between a signal path between the antenna terminal ANT and a first transmission-side input terminal Txg and a signal path between the antenna terminal ANT and a first reception-side output terminal Rxg. The first LC filter 12G is arranged between the first high frequency switch 11G and the first transmission-side input terminal Txg.

The second high frequency switch 11D selectively switches between a signal path between the antenna terminal ANT and a second transmission-side input terminal Txd and a signal path between the antenna terminal ANT and a second reception-side output terminal Rxd. The second LC filter 12D is arranged between the second high frequency switch 11D and the second transmission-side input terminal Txd.

The diplexer 20, when transmitting, selects a transmission signal from either the DCS system or the GSM system, and, when receiving, selects a reception signal to either the DCS system or the GSM system. The diplexer 20 is manufactured so that inductors Lt1, Lt2 and capacitors Cc1, Cc2, Ct1, Ct2, Cu1 are electrically connected. A parallel circuit including the inductor Lt1 and the capacitor Ct1 is electrically connected in series with the signal path of the GSM system, and in the parallel circuit, the side of the first transmission-side input terminal Txg is grounded via the capacitor Cu1. A series circuit including the capacitors Cc1, Cc2 is electrically connected in series with the signal path of the DCS system, and the connection point between the capacitors Cc1, Cc2 is grounded via the inductor Lt2 and the capacitor Ct2.

The first high frequency switch 11G is manufactured so that switching elements such as diodes GD1, GD2, inductors GSL1, GSL2, capacitors GC5, GC6, and a resistor RG are electrically connected. The first diode GD1 is electrically connected in series with a signal path of the GSM system between the antenna terminal ANT and the first transmission-side input terminal Txg such that the anode of the first diode GD1 is disposed on the side of the antenna terminal ANT. In addition, the inductor GSL1 is electrically connected between the cathode of the first diode GD1 and a ground. The second diode GD2 is electrically connected in shunt with a signal path of the GSM system between the antenna terminal ANT and the first reception-side output terminal Rxg, and the anode of the second diode GD2 is grounded via the capacitor GC5. A control voltage terminal Vc is electrically connected via the resistor RG to the connection point between the second diode GD2 and the capacitor GC5. In addition, the inductor GSL2 is electrically connected in series with a signal path on the side of the antenna terminal ANT from the cathode of the second diode GD2, while the capacitor GC6 is electrically connected between the cathode of the second diode GD2 and a ground.

The second high frequency switch 11D is manufactured so that switching elements such as diodes DD1, DD2, inductors DSL1, DSL2, DSLt, capacitors DC5, DCt1, and a resistor RD are electrically connected. The third diode DD1 is electrically connected in series with a signal path of the DCS system between the antenna terminal ANT and the second transmission-side input terminal Txd such that the anode of the third diode DD1 is disposed on the side of the antenna terminal ANT. In addition, the inductor DSL1 is electrically connected between the cathode of the third diode DD1 and a ground. The series circuit of the capacitor DCt1 and the inductor DSLt is electrically connected in parallel with the third diode DD1. The fourth diode DD2 is electrically connected in shunt with a signal path of the DCS system between the antenna terminal ANT and the second reception-side output terminal Rxd, and the anode of the fourth diode DD2 is grounded via the capacitor DC5. A control voltage terminal Vc2 is electrically connected via the resistor RD to the connection point between the fourth diode DD2 and the capacitor DC5. In addition, the inductor DSL2 is electrically connected in series with a signal path on the side of the antenna terminal ANT from the cathode of the fourth diode DD2.

In order to always obtain a high frequency switch having a short switching time from the transmission mode to the reception mode, characteristics of the first and third diodes GD1, DD1 and characteristics of the second and fourth diodes GD2, DD2 are set in appropriate relation to each other. In other words, diodes having a smaller charge capacity are used as the first and third diodes GD1, DD1, while diodes having a larger charge capacity are used as the second and fourth diodes GD2, DD2. More specifically, diodes having different part numbers are used as the first and third diodes GD1, DD1 and the second and fourth diodes GD2, DD2, respectively. Then, diodes of the part number having a smaller charge capacity are used as the first and third diodes GD1, DD1, while diodes of the part number having a large charge capacity are used as the second and fourth diodes GD2, DD2. Preferably, the charge capacity of the diodes having a smaller charge capacity is outside the range of approximately plus or minus 10 percent of the specification of charge capacity of the diodes having a larger charge capacity.

Alternatively, the following classifying process may be performed in advance, and characteristics of the first and third diodes GD1, DD1 and characteristics of the second and fourth diodes GD2, DD2 may be set in appropriate relation to each other. That is, the charge capacity of diodes that belong to the same lot in the ON state (which is in a state where a voltage applied to a diode is approximately equal to or more than 0.4 V) may be measured by a measuring device, such as an impedance analyzer, and then classified. Thus, diodes having a smaller charge capacity may be used as the first and third diodes GD1, DD1, while diodes having a larger charge capacity may be used as the second and fourth diodes GD2, DD2.

The first LC filter 12G is a low-pass filter that includes an inductor GLt1 and capacitors. The first LC filter 12G is arranged between the first high frequency switch 11G and the first transmission-side input terminal Txg. The capacitors of the low-pass filter include a capacitor GCc1 that is electrically connected in parallel with the inductor GLt1 and two ground capacitors (shunt capacitors) GCu1, GCu2 that are grounded.

The second LC filter 12D is arranged between the second high frequency switch 11D and the second transmission-side input terminal Txd so that the parallel circuit of the inductor DLt1 and the capacitor DCc1 and the parallel circuit of the inductor DLt2 and the capacitor DCc2 are electrically connected in series with each other. Both ends of the inductor DLt1 are grounded via the capacitors DCu1, DCu2, respectively.

The operation of the high frequency switch as manufactured above will now be described. When a transmission signal of the DCS system (1.8 MHz band) is transmitted, in the second high frequency switch 11D a voltage of about 2.5 V is, for example, applied to the control voltage terminal Vc2 to bring the third diode DD1 and the fourth diode DD2 into the ON state. Thus, the transmission signal of the DCS system that is entered from the second transmission-side input terminal Txd passes the second LC filter 12D, the second high frequency switch 1D, and the diplexer 20, and the transmission signal is then transmitted from the antenna terminal ANT.

At this time, in the first high frequency switch 11G of the GSM system, a voltage of about 0 V is, for example, applied to the control voltage terminal Vc1 to bring the first diode GD1 into the OFF state. Thus, a transmission signal of the GSM system is prevented from being transmitted. By connecting the diplexer 20, a transmission signal of the DCS system is prevented from flowing into the first transmission-side input terminal Txg and the first reception-side output terminal Rxg in the GSM system. In addition, the second LC filter 12D of the DCS system attenuates second harmonics and third harmonics in the DCS system.

When a transmission signal of the GSM system (900 MHz band) is transmitted, in the first high frequency switch 11G a voltage of about 2.5 V is, for example, applied to the control voltage terminal Vc1 to bring the first diode GD1 and the second diode GD2 into the ON state. Thus, the transmission signal of the GSM system passes the first LC filter 12G, the first high frequency switch 11G, and the diplexer 20, and the transmission signal is then transmitted from the antenna terminal ANT.

At this time, in the high frequency switch 11D of the DCS system, a voltage of about 0 V is, for example, applied to the control voltage terminal Vc2 to bring the third diode DD1 into the OFF state. Thus, a transmission signal of the DCS system is prevented from being transmitted. By connecting the diplexer 20, the transmission signal of the GSM system is prevented from flowing to the second transmission-side input terminal Txd and the second reception-side output terminal Rxd in the DCS system.

Furthermore, second harmonics of the GSM system are attenuated by the low-pass filter that includes the capacitor Ct1, the inductor Lt1, and the shunt capacitor Cu1, which are included in the diplexer 20. Third harmonics of the GSM system are attenuated by the first LC filter 12G of the GSM system.

When reception signals of the DCS system and the GSM system are received, in the high frequency switch 11D of the DCS system, a voltage of about 0 V is, for example, applied to the control voltage terminal Vc2 to bring the third diode DD1 and the fourth diode DD2 into the OFF state, while in the high frequency switch 11G of the GSM system, a voltage of about 0 V is, for example, applied to the control voltage terminal Vc1 to bring the first diode GD1 and the second diode GD2 into the OFF state. Thus, the reception signal of the DCS system is prevented from flowing to the second transmission-side input terminal Txd of the DCS system, and the reception signal of the GSM system is prevented from flowing to the first transmission-side input terminal Txg of the GSM system. The signals that are entered from the antenna terminal ANT are output to the reception-side output terminal Rxd of the DCS system and the reception-side output terminal Rxg of the GSM system, respectively.

By connecting the diplexer 20, the reception signal of the DCS system is prevented from flowing into the GSM system, and the reception signal of the GSM system is prevented from flowing into the DCS system.

The switching operation from the transmission mode to the reception mode in the GSM system will now be described in detail. In the transmission mode, the first diode GD1 and the second diode GD2 are in the ON state. At this time, when electric charge stored in the first diode GD1 is Q1 and electric charge stored in the second diode GD2 is Q2, because the charge capacity of the first diode GD1 is less than the charge capacity of the second diode GD2, the relation that Q1 is less than Q2 (Q1<Q2) is established. In this state, when a voltage of about 0 V is applied to the control voltage terminal Vc1 in order to switch from the transmission mode to the reception mode, both the first diode GD1 and the second diode GD2 discharge the stored electric charge. Because electric charge Q1 stored in the first diode GD1 is less than electric charge Q2 stored in the second diode GD2, the first diode GD1 completes electric discharge first. Accordingly, the first diode GD1 is brought into the OFF state in a shorter amount of time. Thus, a high frequency switch having a short switching time from the transmission mode to the reception mode in the GSM system is obtained.

The switching operation from the transmission mode to the reception mode in the DCS system is similar. That is, in the transmission mode, the third diode DD1 and the fourth diode DD2 are in the ON state. At this time, when electric charge stored in the third diode DD1 is Q1 and electric charge stored in the fourth diode DD2 is Q2, because the charge capacity of the third diode DD1 is less than the charge capacity of the fourth diode DD2, the relation Q1 is less than Q2 (Q1<Q2) is established. In this state, a voltage of 0 V is applied to the control voltage terminal Vc2 in order to switch from the transmission mode to the reception mode, both the third diode DD1 and the fourth diode DD2 discharge the stored electric charge. Because electric charge Q1 stored in the third diode DD1 is less than electric charge Q2 stored in the fourth diode DD2, the third diode DD1 completes electric discharge first. Accordingly, the third diode DD1 is brought into the OFF state in a shorter amount of time. Thus, a high frequency switch having a short switching time from the transmission mode to the reception mode in the DCS system is obtained.

Third Preferred Embodiment

A third preferred embodiment of a triple-band high frequency switch having three different communication systems that include a GSM system, a PCS system, and a DCS system will be described.

The GSM system includes a first high frequency switch 11G, a first LC filter 12G, and capacitors C1g, C2g, GCu3. The structure and operation of the GSM system are substantially the same as those of the second preferred embodiment and the overlapping description will not be repeated.

The structure and operation of the diplexer 20 are substantially the same as those of the second preferred embodiment and the overlapping description will not be repeated.

The PCS system and the DCS system include a second high frequency switch 11D', a second LC filter 12D, a duplexer 14D, and capacitors C1d, C2d, C3d. The circuit arrangements of the second high frequency switch 11D' and second LC filter 12D are substantially the same as those of the second preferred embodiment and the overlapping description will not be repeated.

The duplexer 14D is electrically connected next to the second high frequency switch 11D' to branch a signal path into a reception signal path of the PCS system and a reception signal path of the DCS system.

The second high frequency switch 11D' selectively switches between a transmission signal path, which is shared by the PCS system and the DCS system, located between an antenna terminal ANT and a second transmission-side input terminal Txd, and a PCS system reception signal path and DCS system reception signal path located between the antenna terminal ANT and a second and third reception-side output terminals Rxd1, Rxd2, respectively.

The second high frequency switch 11D' is manufactured so that switching elements such as diodes DD1, DD2, inductors DPSL1, DSL2, DPSLt, capacitors DC5, DC6, DPCt, and a resistor DR1 are electrically connected. The third diode DD1 is electrically connected in series with a transmission signal path, which is shared by the PCS system and the DCS system, between the antenna terminal ANT and the second transmission-side input terminal Txd such that the anode of the third diode DD1 is disposed on the side of the antenna terminal ANT. In addition, the inductor DPSL1 is electrically connected between the cathode of the third diode DD1 and a ground. The series circuit of the capacitor DPCt and inductor DPSLt is electrically connected in parallel with the third diode DD1. The fourth diode DD2 is electrically connected in shunt with a reception signal path, which is shared by the PCS system and the DCS system, between the antenna terminal ANT and the duplexer 14D, and the anode of the fourth diode DD2 is grounded via the capacitor DC5. A control voltage terminal Vc3 is electrically connected via the resistor DR1 to the connection point between the fourth diode DD2 and the capacitor DC5. In addition, the inductor DSL2 is electrically connected in series with a signal path on the side of the antenna terminal ANT from the cathode of the fourth diode DD2.

In order to always obtain a high frequency switch that has a short switching time from the transmission mode to the reception mode, characteristics of the first and third diodes GD1, DD1 and characteristics of the second and fourth diodes GD2, DD2 are set in appropriate relation to each other. That is, diodes having a smaller charge capacity are used as the first and third diodes GD1, DD1, while diodes having a large charge capacity are used as the second and fourth diodes GD2, DD2. More specifically, diodes having different part numbers are used as the first and third diodes GD1, DD1 and second and the fourth diodes GD2, DD2, respectively. Thus, diodes of the part number having a smaller charge capacity are used as the first and third diodes GD1, DD1, while diodes of the part number having a larger charge capacity are used as the second and fourth diodes GD2, DD2. Preferably, the charge capacity of the diodes of the part number having a smaller charge capacity is outside the range of plus or minus 10 percent of the specification of charge capacity of the diodes of the part number having a larger charge capacity.

Alternatively, the following classifying process may be performed in advance, and characteristics of the first and third diodes GD1, DD1 and characteristics of the second and fourth diodes GD2, DD2 may be set in appropriate relation to each other. That is, the charge capacity of diodes that belong to the same lot in the ON state (which is in a state where a voltage applied to a diode is approximately equal to or more than 0.4 V) may be measured by a measuring device, such as an impedance analyzer, and then classified, so that diodes having a smaller charge capacity are used as the first and third diodes GD1, DD1, while diodes having a large charge capacity are used as the second and fourth diodes GD2, DD2.

The duplexer 14D is manufactured so that switching elements such as diodes PD1, PD2, inductors PSL1, PSL2, a capacitor PC5, and a resistor PR1 are electrically connected. The diode PD1 is electrically connected in series with a transmission signal path of the PCS system between the second high frequency switch 11D' and the third reception-side output terminal Rxd2 such that the anode of the diode PD1 is disposed on the side of the second high frequency switch 11D'. In addition, the inductor PSL1 is electrically connected between the cathode of the diode PD1 and a ground. The diode PD2 is electrically connected in shunt with a reception signal path of the DCS system between the high frequency switch 11D' and the second reception-side output terminal Rxd1, and the anode of the diode PD2 is grounded via the capacitor PC5. A control voltage terminal Vc2 is electrically connected via the resistor PR1 to the connection point between the diode PD2 and the capacitor PC5. In addition, the inductor PSL2 is electrically connected in series with a signal path on the side of the second high frequency switch 11D' from the cathode of the diode PD2.

The operation of the above described high frequency switch will now be described. When a transmission signal of the DCS system or PCS system is transmitted, a voltage of about 2.5 V is, for example, applied to the control voltage terminal Vc3, while a voltage of about 0 V is, for example, applied to the control voltage terminals Vc1, Vc2, so that the diodes DD1, DD2 are brought into the ON state and the diodes GD1, GD2, PD1, PD2 are brought into the OFF state. Thus, the transmission signal of the DCS system (or PCS system) that is entered from the second transmission-side input terminal Txd passes the second LC filter 12D, the second high frequency switch 11D', and the diplexer 20, and the transmission signal is then transmitted from the antenna terminal ANT.

When a transmission signal of the GSM system is transmitted, a voltage of about 2.5 V is, for example, applied to the control voltage terminal Vc1, while a voltage of about 0 V is, for example, applied to the control voltage terminals Vc2, Vc3, so that the diodes GD1, GD2 are brought into the ON state and the diodes DD1, DD2, PD1, PD2 are brought into the OFF state. Thus, the transmission signal of the GSM system that is entered from the first transmission-side input terminal Txg passes the first LC filter 12G, the first high frequency switch 11G, and the diplexer 20, and the transmission signal is then transmitted from the antenna terminal ANT.

When a reception signal of the DCS system is received, a voltage of about 0 V is, for example, applied to all of the control voltage terminals Vc1, Vc2, Vc3, so that the diodes GD1, GD2, DD1, DD2, PD1, PD2 are brought into the OFF state. Thus, a signal that is input from the antenna terminal ANT is output to the reception-side output terminal Rxd1 of the DCS system.

When a reception signal of the PCS system is received, a voltage of about 2.5 V is, for example, applied to the control voltage terminal Vc2, while a voltage of about 0 V is, for example, applied to the control voltage terminals Vc1, Vc3, so that the diodes PD1, PD2 are brought into the ON state and the diodes GD1, GD2, DD1, DD2 are brought into the OFF state. Thus, a signal that is input from the antenna terminal ANT is output to the reception-side output terminal Rxd2 of the PCS system.

When a reception signal of the GSM system is received, a voltage of about 0 V is, for example, applied to all of the control voltage terminals Vc1, Vc2, Vc3, so that the diodes GD1, GD2, DD1, DD2, PD1, PD2 are brought into the OFF state. Thus, a signal that is input from the antenna terminal ANT is output to the reception-side output terminal Rxg of the GSM system.

By connecting the diplexer 20, reception signals of the DCS system and PCS system are prevented from flowing into the GSM system, while a reception signal of the GSM system is prevented from flowing into the DCS system and PDS system.

When the transmission mode is switched to the reception mode in the GSM system, the DCS system, and the PCS system, because the charge capacity of the diodes GD1, DD1 is less than the charge capacity of the diodes GD2, DD2, the diodes GD1, DD1 are brought into the OFF state in a shorter amount of time. Thus, a high frequency switch that has a short switching time from the transmission mode to the reception mode in the GSM system, the DCS system, and the PCS system is obtained.

Alternative Preferred Embodiments

It is noted that a high frequency switch and a method for manufacturing the high frequency switch are not limited to the preferred embodiments described above, and may be modified according to various alternative preferred embodiments without departing from the scope of the invention.

As described above, the present invention is useful for a high frequency switch and a method for manufacturing the high frequency switch, which are applicable to a plurality of different mobile communication systems and is, in particular, advantageous in that a switching time from the transmission mode to the reception mode is short.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A high frequency switch comprising:
a switch including a first diode and a second diode, the first diode being electrically connected in series with a signal path between an antenna terminal and a transmission-side input terminal, the second diode being electrically connected in shunt with a signal path between the antenna terminal and a reception-side output terminal; wherein
the switch selectively switches between the signal path between the antenna terminal and the transmission-side input terminal and the signal path between the antenna terminal and the reception-side output terminal; and
a diode having a smaller charge capacity is used as the first diode, and a diode having a larger charge capacity greater than the smaller charge capacity is used as the second diode, such that the charge capacity of the first diode is less than the charge capacity of the second diode.

2. The high frequency switch according to claim 1, wherein the charge capacity of the diode having a smaller charge capacity is outside the range of about minus 10 percent of the specification of charge capacity of the diode having a larger charge capacity.

3. The high frequency switch according to claim 1, wherein the part number of the diode having a larger charge capacity differs from the part number of the diode having a smaller charge capacity.

4. A high frequency switch comprising:
a diplexer;

a first switch; and
a second switch; wherein
the diplexer is electrically connected next to an antenna terminal to branch a signal path into a signal path of a first communication system and a signal path of a second communication system;
the first switch is arranged in the signal path of the first communication system and includes a first diode and a second diode, the first diode being electrically connected in series with a signal path between the antenna terminal and a first transmission-side input terminal, the second diode being electrically connected in shunt with a signal path between the antenna terminal and a first reception-side output terminal;
the first switch selectively switches between the signal path between the antenna terminal and the first transmission-side input terminal and the signal path between the antenna terminal and the first reception-side output terminal;
the second switch is arranged in the signal path of the second communication system and includes a third diode and a fourth diode, the third diode being electrically connected in series with a signal path between the antenna terminal and a second transmission-side input terminal, the fourth diode being electrically connected in shunt with a signal path between the antenna terminal and a second reception-side output terminal;
the second switch selectively switches between the signal path between the antenna terminal and the second transmission-side input terminal and the signal path between the antenna terminal and the second reception-side output terminal; and
diodes having a smaller charge capacity are used as the first diode and the third diode, and diodes having a larger charge capacity greater than the smaller charge capacity are used as the second diode and the fourth diode, such that the charge capacities of the first diode and third diode are less than the charge capacities of the second diode and fourth diode, respectively.

5. The high frequency switch according to claim 4, wherein the charge capacity of the diodes having a smaller charge capacity is outside the range of about minus 10 percent of the specification of charge capacity of the diodes having a larger charge capacity.

6. The high frequency switch according to claim 4, wherein the part number of the diodes having a larger charge capacity differs from the part number of the diodes having a smaller charge capacity.

7. A high frequency switch comprising:
a diplexer;
a first switch;
a second switch; and
a duplexer; wherein
the diplexer is electrically connected next to an antenna terminal to branch a signal path into a signal path of a first communication system and a signal path of a second communication system and third communication system;
the first switch is arranged in the signal path of the first communication system and includes a first diode and a second diode, the first diode being electrically connected in series with a signal path between the antenna terminal and a first transmission-side input terminal, the second diode being electrically connected in shunt with a signal path between the antenna terminal and a first reception-side output terminal;
the first switch selectively switches between the signal path between the antenna terminal and the first transmission-side input terminal and the signal path between the antenna terminal and the first reception-side output terminal;
the second switch is arranged in the signal path of the second communication system and third communication system and includes a third diode and a fourth diode, the third diode being electrically connected in series with a signal path between the antenna terminal and a second transmission-side input terminal, which is a terminal shared by the second communication system and the third communication system, the fourth diode being electrically connected in shunt with a signal path between the antenna terminal and second and third reception-side output terminals;
the second switch selectively switches between the signal path between the antenna terminal and the second transmission-side input terminal and the signal path between the antenna terminal and the second and third reception-side output terminals;
the duplexer is arranged in the signal path of the second communication system and third communication system to branch the signal path into a signal path between the second switch and the second reception-side output terminal and a signal path between the second switch and the third reception-side output terminal; and
diodes having a smaller charge capacity are used as the first diode and the third diode, and diodes having a larger charge capacity greater than the smaller charge capacity are used as the second diode and the fourth diode, such that the charge capacities of the first diode and third diode are less than the charge capacities of the second diode and fourth diode.

8. The high frequency switch according to claim 7, wherein the charge capacity of the diodes having a smaller charge capacity is outside the range of about minus 10 percent of the specification of charge capacity of the diodes having a larger charge capacity.

9. The high frequency switch according to claim 7, wherein the part number of the diodes having a larger charge capacity differs from the part number of the diodes having a smaller charge capacity.

10. A method for manufacturing a high frequency switch having a switch that includes a first diode and a second diode, the first diode being electrically connected in series with a signal path between an antenna terminal and a transmission-side input terminal, the second diode being electrically connected in shunt with a signal path between the antenna terminal and a reception-side output terminal, wherein the switch selectively switches between the signal path between the antenna terminal and the transmission-side input terminal and the signal path between the antenna terminal and the reception-side output terminal, the method comprising the steps of:
classifying diodes that belong to the same lot on the basis of the charge capacity thereof;
using a diode having a smaller charge capacity as the first diode; and
using a diode having a larger charge capacity as the second diode.

11. A method for manufacturing a high frequency switch having a diplexer, a first switch, and a second switch, wherein the diplexer is electrically connected next to an antenna terminal to branch a signal path into a signal path of a first communication system and a signal path of a second communication system, wherein the first switch is arranged in the signal path of the first communication system and includes a first diode and a second diode, the first diode being electrically connected in series with a signal path between the antenna terminal and a first transmission-side input terminal, the second diode being electrically connected in shunt with a signal path between the antenna terminal and a first reception-side output terminal, wherein the first switch selectively switches between the signal path between the antenna terminal and the first transmission-side input terminal and the signal path between the antenna terminal and the first reception-side output terminal, wherein the second switch is arranged in the signal path of the second communication system and includes a third diode and a fourth diode, the third diode being electrically connected in series with a signal path between the antenna terminal and a second transmission-side input terminal, the fourth diode being electrically connected in shunt with a signal path between the antenna terminal and a second reception-side output terminal, wherein the second switch selectively switches between the signal path between the antenna terminal and the second transmission-side input terminal and the signal path between the antenna terminal and the second reception-side output terminal, the method comprising the steps of:

classifying diodes that belong to the same lot on the basis of the charge capacity thereof;

using diodes having a smaller charge capacity as the first diode and the third diode; and using diodes having a larger charge capacity as the second diode and the fourth diode.

12. A method for manufacturing a high frequency switch having a diplexer, a first switch, a second switch, and a duplexer, wherein the diplexer is electrically connected next to an antenna terminal to branch a signal path into a signal path of a first communication system and a signal path of a second communication system and third communication system, wherein the first switch is arranged in the signal path of the first communication system and includes a first diode and a second diode, the first diode being electrically connected in series with a signal path between the antenna terminal and a first transmission-side input terminal, the second diode being electrically connected in shunt with a signal path between the antenna terminal and a first reception-side output terminal, wherein the first switch selectively switches between the signal path between the antenna terminal and the first transmission-side input terminal and the signal path between the antenna terminal and the first reception-side output terminal, wherein the second switch is arranged in the signal path of the second communication system and third communication system and includes a third diode and a fourth diode, the third diode being electrically connected in series with a signal path between the antenna terminal and a second transmission-side input terminal, which is a terminal shared by the second communication system and the third communication system, the fourth diode being electrically connected in shunt with a signal path between the antenna terminal and second and third reception-side output terminals, wherein the second switch selectively switches between the signal path between the antenna terminal and the second transmission-side input terminal and the signal path between the antenna terminal and the second and third reception-side output terminals, wherein the duplexer is arranged in the signal path of the second communication system and third communication system to branch the signal path into a signal path between the second switch and the second reception-side output terminal and a signal path between the second switch and the third reception-side output terminal, the method comprising the steps of:

classifying diodes that belong to the same lot on the basis of the charge capacity thereof;

using diodes having a smaller charge capacity as the first diode and the third diode; and using diodes having a larger charge capacity as the second diode and the fourth diode.

* * * * *